(12) United States Patent
Yagyu (10) Patent No.: US 7,956,901 B2
(45) Date of Patent: Jun. 7, 2011

(54) LIVE-VIEW OPTICAL SYSTEM AND IMAGE CAPTURE APPARATUS

(75) Inventor: Genta Yagyu, Hyogo (JP)

(73) Assignee: Sony Corporation, Tokyo (JP)

( * ) Notice: Subject to any disclaimer, the term of this patent is extended or adjusted under 35 U.S.C. 154(b) by 400 days.

(21) Appl. No.: 12/226,976

(22) PCT Filed: Mar. 3, 2008

(86) PCT No.: PCT/JP2008/053787
§ 371 (c)(1),
(2), (4) Date: Nov. 3, 2008

(87) PCT Pub. No.: WO2008/142894
PCT Pub. Date: Nov. 27, 2008

(65) Prior Publication Data
US 2010/0171867 A1    Jul. 8, 2010

(30) Foreign Application Priority Data
May 21, 2007    (JP) .................................. 2007-134505

(51) Int. Cl.
*H04N 3/14* (2006.01)
*H04N 5/335* (2006.01)
(52) U.S. Cl. ...................... 348/220.1; 348/294; 348/297; 348/335; 348/340; 348/345
(58) Field of Classification Search .......... 348/294–324, 348/220.1, 335, 340, 345; 396/147, 148, 396/286, 296
See application file for complete search history.

(56) References Cited

U.S. PATENT DOCUMENTS
4,664,485 A * 5/1987 Momiyama et al. .......... 359/645

FOREIGN PATENT DOCUMENTS
JP    2001-133846         5/2001
JP    2001-281751 A      10/2001

OTHER PUBLICATIONS

Notification of Transmittal of Copies of Translation of the International Preliminary Report on Patentability as mailed Jan. 21, 2010 Form PCT/IB/338, Form PCT/IB/373 and Form PCT/ISA/237.

* cited by examiner

*Primary Examiner* — Yogesh K Aggarwal
(74) *Attorney, Agent, or Firm* — Rader, Fishman & Grauer PLLC

(57) ABSTRACT

A live-view optical system A is, in an image capture apparatus capable of obtaining an image of an object in a moving picture mode by reflecting an optical image formed on a focusing plate D from a part of a reflective surface F of a penta-dach mirror B and by re-forming the optical image on a live-view imaging device H, positioned between an opening G of the penta-dach mirror and the live-view imaging device, and re-forms light reflected from the part of the reflective surface on the live-view imaging device, wherein
a position of an entrance pupil K satisfies the following conditional expression (1).

$$0.75 < ((Dp/2 - Y) \cdot Za)/((Ra/\sqrt{2} - Y) \cdot Zp) \quad (1)$$

where
Dp is a diameter of the entrance pupil of the live-view optical system, Zp is a distance from the focusing plate to the entrance pupil of the live-view optical system, Y is a maximum image height on the focusing plate, Za is a distance from the focusing plate to the opening of the penta-dach mirror, and Ra is a distance from an optical axis of the live-view optical system to a dach ridgeline.

10 Claims, 8 Drawing Sheets

LIVE-VIEW OPTICAL SYSTEM AND IMAGE CAPTURE APPARATUS

TECHNICAL FIELD

The present invention relates to a novel live-view optical system and a novel image capture apparatus. More particularly, the invention relates to an optical system (live-view optical system) guiding an object image into an imaging device for displaying a live-view image (time-sequentially changing image of an object) on a liquid crystal display section or the like, in an image capture apparatus such as a single-lens reflex type camera (hereinafter called "single-lens reflex camera"), and to an image capture apparatus having the live-view optical system.

BACKGROUND ART

Conventionally, single-lens reflex cameras have been equipped with an optical finder which guides light from an imaging lens into a finder optical system by a spring-up mirror inserted between the imaging lens and an imaging surface, and allows a user to observe this through a finder window.

By the way, in digital single-lens reflex cameras, there is a demand that users determine an angle of view and the like, by using a liquid crystal display section or the like provided on the back of the camera body. To meet such a demand, there is a digital single-lens reflex camera as disclosed in Patent Document 1.

In the single-lens reflex camera disclosed in the Patent Document 1, an imaging device for live viewing is provided separately from an imaging device for image taking, and a movable mirror retractable with respect to a finder optical path is provided near an ocular lens. By retractably moving the movable mirror within the finder optical path, it is configured such that a user can selectively switch between a state in which a light flux from an object is guided into the ocular lens facing a finder window, and a state in which the light flux from the object is guided into the live-view imaging device.

[Patent Document 1] Japanese Unexamined Patent Application Publication No. 2001-133846

DISCLOSURE OF THE INVENTION

By the way, in the single-lens reflex camera disclosed in the Patent Document 1 cited above, it is required that a movable mirror retractable with respect to a finder optical path is provided near an ocular lens. Therefore, it requires that the movable mirror which is an element separate from the existing optical elements is arranged near the ocular lens. In addition, a space is required for allowing the movable mirror to enter a finder optical system, so that upsizing the apparatus at a location near the ocular lens is unavoidable.

In order to guide the light flux from the object into the live-view imaging device without adding a special component such as the movable mirror in the Patent Document 1, it is conceivable to change the angle of an optical axis in a direction of the live-view imaging device by changing the angle of a part of a mirror surface of, for example, a penta-dach mirror which is an existing optical element.

However, since the finder optical system faces almost all of an opening of the penta-dach mirror, the range in which a light flux for live viewing passes is limited to a very narrow range of a triangle surrounded by a portion facing the finder optical system and a triangular roof of a dach section. For this reason, unless the live-view optical system guiding the light flux from the opening of the penta-dach mirror into the live-view imaging device is optimized, the periphery of the light flux is vignetted at the opening, so that inconvenience occurs, such as causing a reduction in marginal illumination of a live-view image.

Accordingly, an object of the present invention is to allow the obtaining of a satisfactory live-view image exhibiting less reduction in the marginal illumination by optimizing the live-view optical system for guiding light reflected by a part of the reflective surface of the penta-dach mirror into the live-view imaging device.

A live-view optical system according to an embodiment of the present invention is, in an image capture apparatus capable of obtaining an image of an object in a moving picture mode by reflecting an optical image formed on a focusing plate by a part of a reflective surface of a penta-dach mirror and re-forming the optical image on a live-view imaging device, positioned between an opening of the penta-dach mirror and the live-view imaging device, and re-forms light reflected by the part of the reflective surface on the live-view imaging device. In the live-view optical system, a position of an entrance pupil satisfies the following conditional expression (1):

$$0.75 < ((Dp/2-Y) \cdot Za)/((Ra\sqrt{2}-Y) \cdot Zp) \quad (1)$$

where

Dp is a diameter of the entrance pupil of the live-view optical system,

Zp is a distance from the focusing plate to the entrance pupil of the live-view optical system, Y is a maximum image height on the focusing plate, Za is a distance from the focusing plate to the opening of the penta-dach mirror, and Ra is a distance from an optical axis of the live-view optical system to a dach ridgeline.

Furthermore, an image capture apparatus according to an embodiment of the present invention is an image capture apparatus capable of obtaining an image of an object in a moving picture mode by reflecting an optical image formed on a focusing plate by a part of a reflective surface of a penta-dach mirror and re-forming the optical image on a live-view imaging device. The position of an entrance pupil of a live-view optical system, which is positioned between an opening of the penta-dach mirror and the live-view imaging device, and which re-forms light reflected by the part of the reflective surface on the live-view imaging device, satisfies the following conditional expression (1):

$$0.75 < ((Dp/2-Y) \cdot Za)/((Ra\sqrt{2}-Y) \cdot Zp) \quad (1)$$

where

Dp is a diameter of the entrance pupil of the live-view optical system,

Zp is a distance from the focusing plate to the entrance pupil of the live-view optical system, Y is a maximum image height on the focusing plate, Za is a distance from the focusing plate to the opening of the penta-dach mirror, and Ra is a distance from an optical axis of the live-view optical system to a dach ridgeline.

According to the present invention, the vignetting at the opening of the penta-dach mirror of the light reflected by the part of the reflective surface of the penta-dach mirror and heading toward the live-view imaging device is decreased, so that it becomes possible to obtain a live-view image exhibiting a less reduction in the marginal illumination.

BEST MODE FOR CARRYING OUT THE INVENTION

Best modes for carrying out a live-view optical system and an image capture apparatus according to the present invention will be described below.

The live-view optical system according to the present invention is, in an image capture apparatus capable of obtaining an image of an object in a moving picture mode by reflecting an optical image formed on a focusing plate from a part of a reflective surface of a penta-dach mirror and by re-forming the optical image on a live-view imaging device, positioned between an opening of the penta-dach mirror and the live-view imaging device, and re-forms light reflected by the part of the reflective surface on the live-view imaging device. In the live-view optical system, a position of an entrance pupil satisfies the following conditional expression (1):

$$0.75 < ((Dp/2-Y) \cdot Za)/((Ra\sqrt{2}-Y) \cdot Zp) \qquad (1)$$

where

Dp is a diameter of the entrance pupil of the live-view optical system,

Zp is a distance from the focusing plate to the entrance pupil of the live-view optical system, Y is a maximum image height on the focusing plate, Za is a distance from the focusing plate to the opening of the penta-dach mirror, and Ra is a distance from an optical axis of the live-view optical system to a dach ridgeline.

Referring to FIGS. 1 to 4, outline of the live-view optical system according to the present invention will be explained.

According to the live-view optical system of the present invention, the vignetting at the opening of the penta-dach mirror, of the light reflected by a part of the reflective surface of the penta-dach mirror and heading toward the live-view imaging device, is decreased, so that it becomes possible to obtain a live-view image exhibiting a less reduction in marginal illumination.

Figure 1:
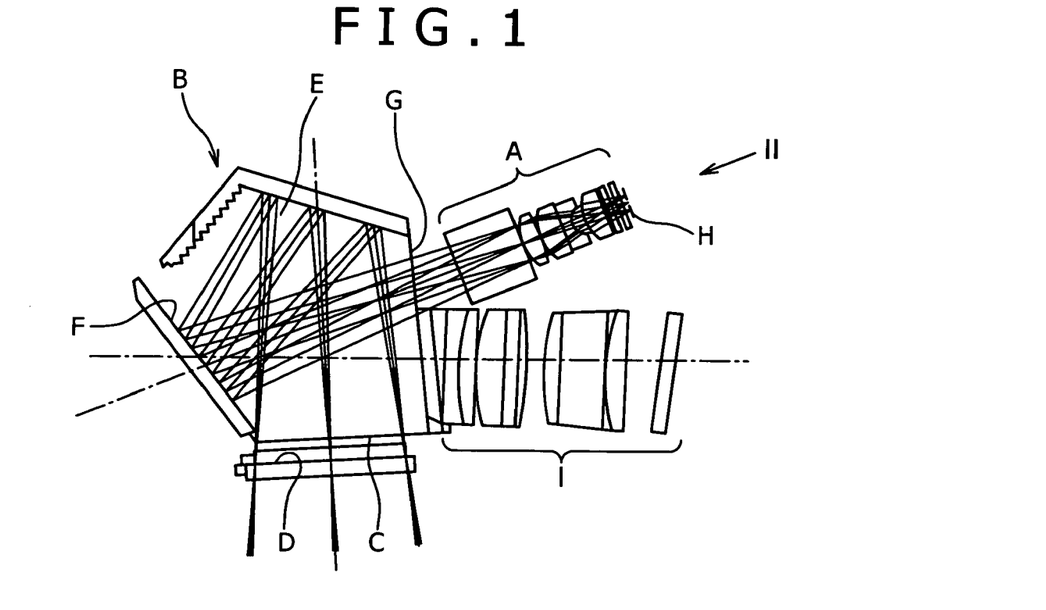
FIG. 1 is for explaining an overview of a live-view optical system according to the present invention, along with FIGS. 2 to 4, and the figure shows an outline of an optical configuration.
Figure 2:
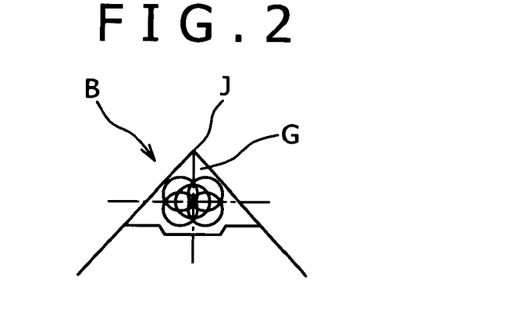
FIG. 2 is a view as seen from an arrow II in FIG. 1.

FIG. 1 shows a construction of a live-view optical system A and the periphery thereof, and FIG. 2 shows a view as seen from an arrow II in FIG. 1.

A focusing plate D is arranged to face an incident section C of a penta-dach mirror B. A light flux which has transmitted through an image-formation point of the focusing plate D is reflected by a dach section E and heads toward a first reflective surface F, in the penta-dach mirror B. After being reflected by the first reflective surface F, the light flux outgoes from an opening section G of the penta-dach mirror B, and enters the live-view optical system A, and its image is re-formed on a live-view imaging device H by this live-view optical system A.

Since a finder optical system I for an optical finder faces the opening section G of the penta-dach mirror B, the portion in which the live-view optical system A faces is only a narrow space between a portion facing the finder optical system I and a dach ridgeline J. In addition, because the space is limited by the slopes of the dach section at both sides, if the light flux spreads widely after reflected by the first reflective surface F, the periphery of the light flux may be vignetted by the opening section G, to cause a reduction in marginal illumination.

Figure 4:
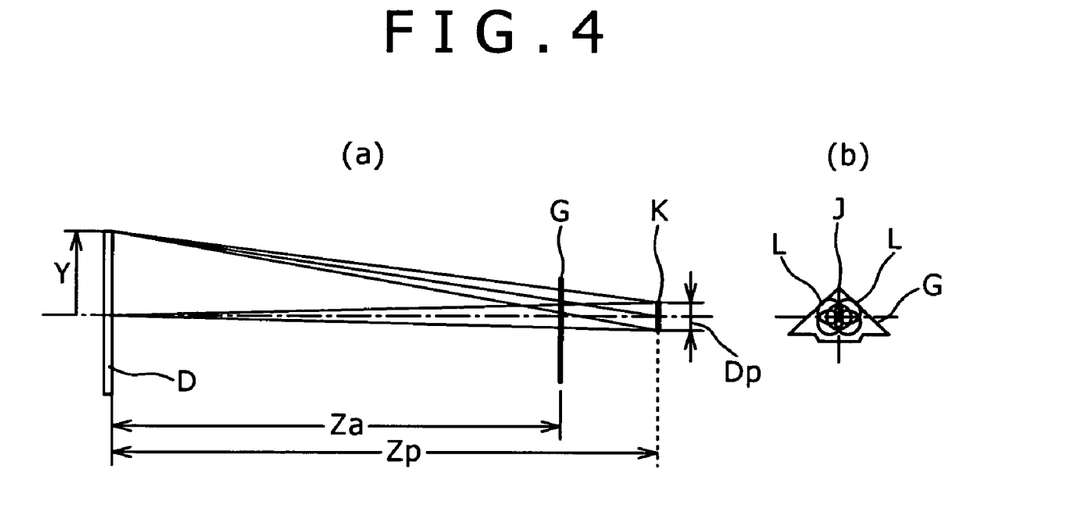
FIG. 4 illustrates a case where a conditional expression (1) is not satisfied, wherein (a) shows positional relationships between various parts and (b) shows conditions of light flux in an opening of a penta-dach mirror.

If other parameters, i.e., Dp, Y, Za, and Ra, are unchanged, when the position of an entrance pupil K of the live-view optical system A is set distant from the opening section G of the penta-dach mirror B (a case of FIG. 4(a)), the diameter of the light flux passing through the opening section G increases, to cause a portion L vignetted by the opening section G (see FIG. 4(b)) and thus to cause a reduction in marginal illumination.

Figure 3:
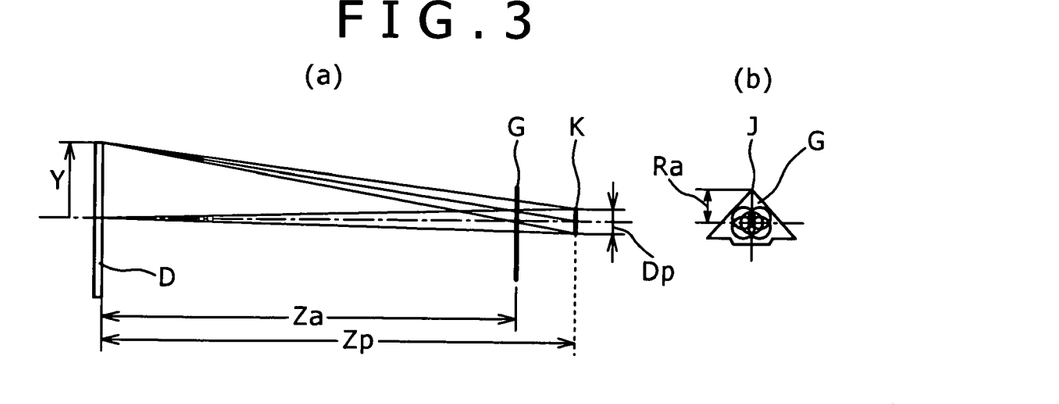
FIG. 3 illustrates a case where a conditional expression (1) is satisfied, wherein (a) shows positional relationships between various parts and (b) shows conditions of light flux in an opening of a penta-dach mirror.

Consequently, by limiting the position of the entrance pupil K of the live-view optical system A within a range set by the conditional expression (1), the entrance pupil K position is set near the opening section G of the penta-dach mirror B (a case of FIG. 3(a)), to reduce the light flux diameter during passage through the opening section G (see FIG. 3(b)); to decrease vignetting of the periphery of the light flux, and thus to suppress the reduction in marginal illumination.

Accordingly, it is important to satisfy the conditional expression (1).

It is desirable that a live-view optical system according to an embodiment of the present invention includes, in order from an object side, a first lens having a positive refractive power, a second lens having a negative refractive power, and a third lens having a positive refractive power, that the first lens and the second lens are plastic lenses, and that the following conditional expression (2) is satisfied:

$$-0.65 < \phi p1/\phi m1 < -0.45 \qquad (2)$$

where $\phi p1$ is a refractive power of the positive plastic lens (first lens), and $\phi m1$ is a refractive power of the negative plastic lens (second lens).

By using plastic lenses for the two lenses, i.e., the first lens and the second lens, a cost reduction can be achieved. In addition, by using the plastic lenses, aspherizing becomes easy, and through the aspherizing, aberration correction can be performed satisfactorily.

However, in a plastic lens, the refractive power easily undergoes change due to expansion or contraction caused by ambient temperature change, whereby lens back of an optical system changes. In order to suppress this change, the first lens is a positive plastic lens and the second lens is a negative plastic lens, and the conditional expression (2) is satisfied, so that changes in the refractive power of the individual lenses caused by temperature change can be cancelled out totally. When exceeding the upper and lower limits in the conditional expression, change in the lens back caused by ambient temperature change is so large that the image quality of a live-view image deteriorates greatly.

It is desirable that a live-view optical system according to an embodiment of the present invention includes, in order from the object side, a first lens having a positive refractive power, a second lens having a negative refractive power, and a third lens having a positive refractive power, that the second lens and the third lens are plastic lenses, and that the following conditional expression (3) is satisfied:

$$-0.85 < \phi p2/\phi m2 < -0.65 \qquad (3)$$

where $\phi p2$ is a refractive power of the positive plastic lens (third lens), and $\phi m2$ is a refractive power of the negative plastic lens (second lens).

By using plastic lenses for the two lenses, i.e., the second lens and the third lens, a cost reduction can be achieved. In addition, by using the plastic lenses, aspherizing becomes easy, and through the aspherizing, aberration correction can be performed satisfactorily.

However, in a plastic lens, the refractive power easily undergoes change due to expansion or contraction caused by ambient temperature change, so that lens back of the optical system changes. In order to suppress this change, the second lens is a negative plastic lens and the third lens is a positive plastic lens, and the conditional expression (3) is satisfied, so that changes in the refractive power of the individual lenses caused by temperature change can be cancelled out totally. When exceeding the upper and lower limits in the conditional expression (3), change in the lens back caused by ambient temperature change is so large that the image quality of a live-view image deteriorates greatly.

It is desirable that a live-view optical system according to an embodiment of the present invention includes, in order from the object side, a cemented positive lens constructed of a first lens and a second lens, a third lens having a negative refractive power, and a fourth lens having a positive refractive power, wherein the third lens and the fourth lens are plastic lenses, and the following conditional expression (4) is satisfied:

$$-1.05 < \phi p3/\phi m3 < -0.85 \qquad (4)$$

where $\phi p3$ is a refractive power of the positive plastic lens (fourth lens), and $\phi m3$ is a refractive power of the negative plastic lens (third lens).

By using plastic lenses for the two lenses, i.e., the third lens and the fourth lens, a cost reduction can be achieved. In addition, by using the plastic lenses, aspherizing becomes easy, and through the aspherizing, aberration correction can be performed satisfactorily.

However, in a plastic lens, the refractive power easily undergoes change due to expansion or contraction caused by ambient temperature change, so that lens back of the optical system changes. In order to suppress this change, the third lens is a negative plastic lens and the fourth lens is a positive plastic lens, and the conditional expression (4) is satisfied, so that changes in the refractive power of the individual lenses caused by temperature change can be cancelled out totally. When exceeding the upper and lower limits in the conditional expression (4), change in the lens back caused by ambient temperature change is so large that the image quality of a live-view image deteriorates greatly.

It is desirable that a live-view optical system according to an embodiment of the present invention includes in order from the object side, a first lens having a negative refractive power, a second lens having a positive refractive power, a third lens having a negative refractive power, and a fourth lens having a positive refractive power, that the first lens and the fourth lens are plastic lenses, and that the following conditional expression (5) is satisfied:

$$-1.80 < \phi p4/\phi m4 < -1.40 \qquad (5)$$

where $\phi p4$ is a refractive power of the positive plastic lens (fourth lens), and $\phi m4$ is a refractive power of the negative plastic lens (first lens).

By using plastic lenses for the two lenses, i.e., the first lens and the fourth lens, a cost reduction can be achieved. In addition, by using the plastic lenses, aspherizing becomes easy, and through the aspherizing, aberration correction can be performed satisfactorily.

However, in a plastic lens, the refractive power easily undergoes change due to expansion or contraction caused by ambient temperature change, so that lens back of the optical system changes. In order to suppress this change, the first lens is a negative plastic lens and the fourth lens is a positive plastic lens, and the conditional expression (5) is satisfied, so that changes in the refractive power of the individual lenses caused by temperature change can be cancelled out totally. When exceeding the upper and lower limits in the conditional expression (5), change in the lens back caused by ambient temperature change is so large that the image quality of a live-view image deteriorates greatly.

It is desirable that a live-view optical system according to an embodiment of the present invention includes, in order from the object side, a first lens having a positive refractive power, a second lens having a positive refractive power, a third lens having a negative refractive power, and a fourth lens having a positive refractive power, that the first lens and the third lens are plastic lenses, and that the following conditional expression (6) is satisfied:

$$-0.40 < \phi p5/\phi m5 < -0.20 \quad (6)$$

where

φp5 is a refractive power of the positive plastic lens (first lens), and

φm5 is a refractive power of the negative plastic lens (third lens).

By using plastic lenses for the two lenses, i.e., the first lens and the third lens, a cost reduction can be achieved. In addition, by using the plastic lenses, aspherizing becomes easy, and through the aspherizing, aberration correction can be performed satisfactorily.

However, in a plastic lens, the refractive power easily undergoes change due to expansion or contraction caused by ambient temperature change, so that lens back of the optical system changes. In order to suppress the change, the first lens is a positive plastic lens and the third lens is a negative plastic lens, and the conditional expression (6) is satisfied, so that changes in the refractive power of the individual lenses caused by temperature change can be cancelled out totally. When exceeding the upper and lower limits in the conditional expression (6), change in the lens back caused by ambient temperature change is so large that the quality of a live-view image deteriorates greatly.

It is desirable that a live-view optical system according to an embodiment of the present invention have an aperture stop on the object side of the first lens.

By positioning the aperture stop on the object side of the first lens, the entrance pupil can be positioned nearer to the object side of the live-view optical system, so that it is possible to reduce vignetting at the opening of the penta-dach mirror of the light reflected by the first reflective surface. This makes it easier to satisfy the conditional expression (1).

It is desirable that a live-view optical system according to an embodiment of the present invention includes an optical path branching means on the object side (the object side of the aperture stop when the aperture stop is provided on the object side of the first lens) of the first lens. By branching a part of a light flux for live viewing through the optical path branching means, the branched light flux can be utilized as light flux for photometric measurement. For example, the light flux branched by the optical path branching means is entered to an AF (Auto-Focus) sensor, whereby autofocusing operation can be performed.

Next, specific embodiments of the live-view optical system of the present invention will be described.

In the respective embodiments, aspherical surfaces are employed, and the shape of each of the aspherical surfaces is supposed to be defined by the following Numerical Expression 1.

$$x = \frac{y^2 \cdot c^2}{1 + \sqrt{1 - \varepsilon \cdot y^2 \cdot c^2}} + \sum A^i \cdot y^i \quad \text{[Numerical expression 1]}$$

Note that, in the numerical expression 1, x is the distance in an optical axis direction from the vertex of the lens surface, y is the height in a direction perpendicular to the optical axis, c is the paraxial curvature at the vertex of the lens surface, ε is the conic constant, and Ai is the i-th order aspherical coefficient.

Figure 5:
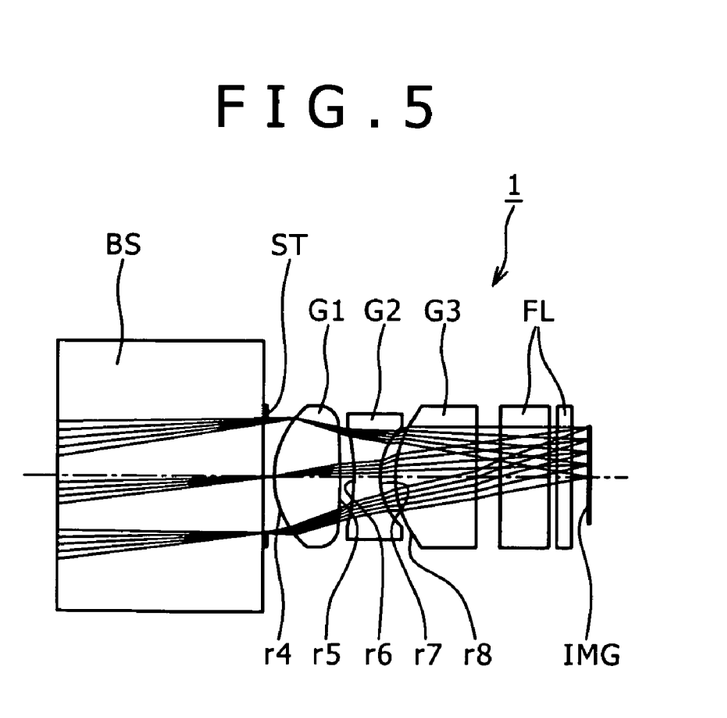
FIG. 5 is a view showing a lens construction according to a first embodiment of the live-view optical system.

FIG. 5 is a view showing a lens construction according to a first embodiment 1 of the live-view optical system of the present invention. A live-view optical system 1 is composed by arranging, in order from the object side, an optical path branching means BS, a first lens G1 having a positive refractive power, a second lens G2 having a negative refractive power, and a third lens G3 having a positive refractive power. A filter FL such as a low-pass filter is inserted between an imaging surface IMG and the third lens G3, and an aperture stop ST is arranged between the first lens G1 and the optical path branching means BS. The first lens G1 and the second lens G2 are plastic lenses. Further, both surfaces (r4, r5) of the first lens G1, both surfaces (r6, r7) of the second lens G2, and an object-side surface (r8) of the third lens G3 are formed of aspherical surfaces.

Table 1 shows the lens data of a numerical example 1 in which specific numerical values are applied to the first embodiment 1. It is noted that, in Table 1 and other lens-data tables, "ri" denotes a paraxial radius of curvature of an i-th surface counted from the object side, "di" denotes an on-axis surface distance between the i-th surface and an (i+1)-th surface counted from the object side, "Ni" denotes a refractive index, with respect to d-line (wavelength=587.6 nm), of the i-th glass material counted from the object side, and "υi" denotes an Abbe number, with respect to d-line, of the i-th glass material counted from the object side. Further, "f" and "FNO." denote a focal length and an F-number, respectively.

TABLE 1 f = 7.164 FNO. = 2.0

| RADIUS OF CURVATURE | ON-AXIS SURFACE DISTANCE | REFRACTIVE INDEX (Nd) | ABBE NUMBER (νd) |
|---|---|---|---|
| r1 = ∞ | d1 = 7.000 | N1 = 1.51680 | ν1 = 64.20 |
| r2 = ∞ | d2 = 0.100 | | |
| r3 = ∞ | d3 = 0.200 | | |
| r4 = 2.955 | d4 = 2.307 | N2 = 1.53048 | ν2 = 55.72 |
| r5 = −13.068 | d5 = 0.412 | | |
| r6 = −8.031 | d6 = 1.000 | N3 = 1.60700 | ν3 = 27.00 |
| r7 = 2.009 | d7 = 0.475 | | |
| r8 = 3.180 | d8 = 2.807 | N4 = 1.85135 | ν4 = 40.10 |
| r9 = 103.341 | d9 = 0.822 | | |
| r10 = ∞ | d10 = 1.600 | N5 = 1.54426 | ν5 = 69.60 |
| r11 = ∞ | d11 = 0.300 | | |
| r12 = ∞ | d12 = 0.500 | N6 = 1.51680 | ν6 = 64.20 |
| r13 = ∞ | | | |

The 4th-, 6th-, and 8th-order aspherical coefficients A4, A6, and A8 of both surfaces (r4, r5) of the first lens G1, both surfaces (r6, r7) of the second lens G2, and the object-side surface (r8) of the third lens G3 in the numerical example 1 are shown in Table 2, along with cone constants ε. It is noted that in each of Table 2 and the following tables showing aspherical coefficients, "D-i" is an exponential representation which is to base 10, i.e., "10⁻ⁱ"; for example, "0.12345D-05" represents "0.12345×10⁻⁵".

TABLE 2

| SURFACE NUMBER | ε | A4 | A6 | A8 |
|---|---|---|---|---|
| r4 | 0.10000D+01 | −0.79603D−03 | 0.21375D−03 | −0.43125D−05 |
| r5 | 0.10000D+01 | 0.13349D−01 | 0.13276D−02 | −0.85876D−03 |
| r6 | 0.10000D+01 | 0.16784D−01 | −0.24426D−02 | −0.10051D−02 |
| r7 | 0.10000D+01 | −0.29004D−02 | −0.18355D−02 | −0.14851D−02 |
| r8 | 0.10000D+01 | −0.34646D−02 | 0.80660D−03 | −0.21009D−03 |

The numerical example 1 satisfies the conditional expression (2).

Figures 6, 7:
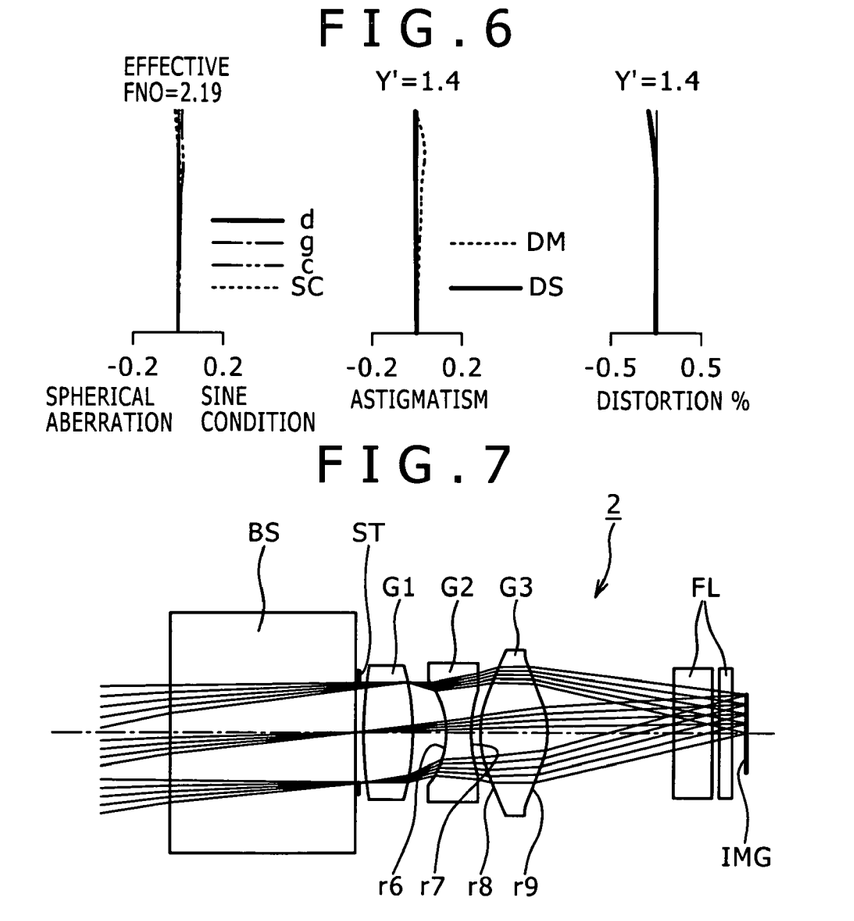
FIG. 6 shows various aberrations, i.e., spherical aberration and a sine condition, astigmatism, and distortion, of a numerical example 1 in which specific numeral values are applied to the first embodiment shown in FIG. 5.
FIG. 7 is a view showing a lens construction according to a second embodiment of the live-view optical system.

FIG. 6 shows various aberrations, i.e., spherical aberration and a sine condition, astigmatism, and distortion, in the first numerical example 1. It is noted that, in a graph showing the spherical aberration and the sine condition, a solid line represents spherical aberration with respect to d-line, an alternate-long-and-short-dashed line represents spherical aberration with respect to g-line (wavelength=435.8 nm), an alternate-long-and-two-short-dashed line represents spherical aberration with respect to C-line (wavelength=656.3 nm), and a dashed line represents the sine condition. Furthermore, in an astigmatism graph, a solid line represents values in a sagittal image surface and a dashed line represents values in a meridional image surface.

FIG. 7 is a view showing a lens construction according to a second embodiment 2 of the live-view optical system of the present invention. A live-view optical system 2 is composed by arranging, in order from the object side, an optical path branching means BS, a first lens G1 having a positive refractive power, a second lens G2 having a negative refractive power, and a third lens G3 having a positive refractive power. A filter FL such as a low-pass filter is inserted between an imaging surface IMG and the third lens G3, and an aperture stop ST is arranged between the first lens G1 and the optical path branching means BS. The second lens G2 and the third lens G3 are plastic lenses. Further, both surfaces (r6, r7) of the second lens G2 and both surfaces (r8, r9) of the third lens G3 are formed of aspherical surfaces.

Table 3 shows the lens data of a numerical example 2 in which specific numerical values are applied to the second embodiment 2.

TABLE 3 f = 7.757 FNO. = 2.0

| RADIUS OF CURVATURE | ON-AXIS SURFACE DISTANCE | REFRACTIVE INDEX (Nd) | ABBE NUMBER (νd) |
|---|---|---|---|
| r1 = ∞ | d1 = 7.000 | N1 = 1.51680 | ν1 = 64.20 |
| r2 = ∞ | d2 = 0.100 | | |
| r3 = ∞ | d3 = 0.200 | | |
| r4 = 19.515 | d4 = 1.848 | N2 = 1.88300 | ν2 = 40.80 |
| r5 = −8.718 | d5 = 1.341 | | |
| r6 = −2.647 | d6 = 1.000 | N3 = 1.60280 | ν3 = 28.30 |
| r7 = 7.552 | d7 = 0.300 | | |
| r8 = 4.262 | d8 = 2.606 | N4 = 1.53048 | ν4 = 55.72 |
| r9 = −3.476 | d9 = 4.868 | | |
| r10 = ∞ | d10 = 1.410 | N5 = 1.54426 | ν5 = 69.60 |
| r11 = ∞ | d11 = 0.300 | | |
| r12 = ∞ | d12 = 0.500 | N6 = 1.51680 | ν6 = 64.20 |
| r13 = ∞ | | | |

The 4th-, 6th-, and 8th-order aspherical coefficients A4, A6, and A8 of both surfaces (r6, r7) of the second lens G2 and both surfaces (r8, r9) of the third lens G3 in the numerical example 2 are shown in Table 4, along with cone constants ε.

TABLE 4

| SURFACE NUMBER | ε | A4 | A6 | A8 |
|---|---|---|---|---|
| r6 | 0.10000D+01 | 0.66681D−02 | −0.25368D−03 | 0.14381D−03 |
| r7 | 0.10000D+01 | −0.13747D−02 | −0.89051D−03 | 0.28892D−04 |
| r8 | 0.10000D+01 | −0.32713D−02 | −0.71414D−04 | 0.23306D−05 |
| r9 | 0.10000D+01 | 0.56866D−02 | 0.29927D−03 | 0.23449D−04 |

The numerical example 2 satisfies the conditional expression (3).

Figure 8:
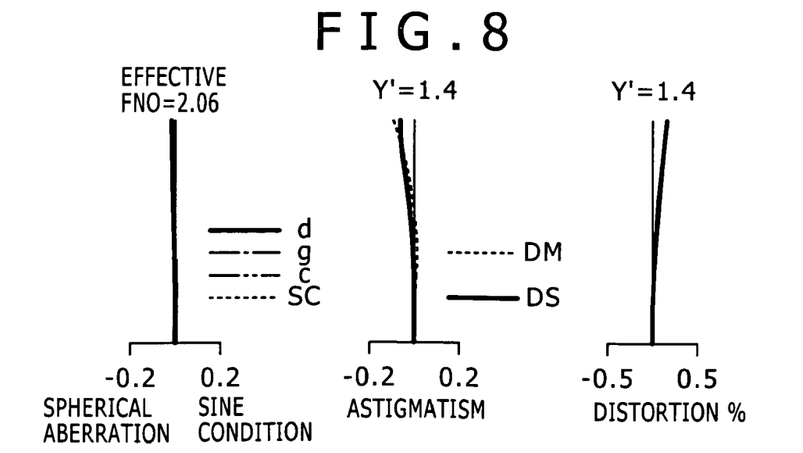
FIG. 8 shows various aberrations, i.e., spherical aberration and a sine condition, astigmatism, and distortion, of a numerical example 2 in which specific numerical values are applied to the second embodiment shown in FIG. 7.

FIG. 8 shows various aberrations, i.e., spherical aberration and a sine condition, astigmatism, and distortion, in the second numerical example 2. It is noted that in a graph showing the spherical aberration and the sine condition, a solid line represents spherical aberration with respect to d-line, an alternate-long-and-short-dashed line represents spherical aberration with respect to g-line, an alternate-long-and-two-short-dashed line represents spherical aberration with respect to C-line, and a dashed line represents the sine condition. Further, in an astigmatism graph, a solid line represents values in a sagittal image surface and a dashed line represents values in a meridional image surface.

Figure 9:
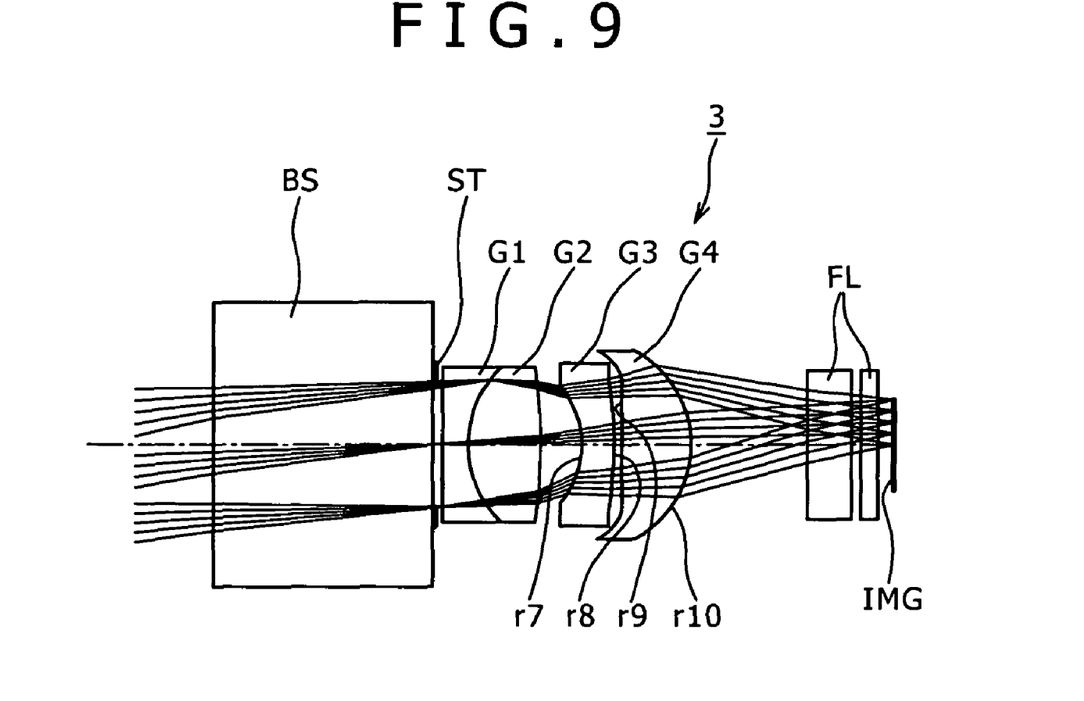
FIG. 9 is a view showing a lens construction according to a third embodiment of the live-view optical system.

FIG. 9 is a view showing a lens construction according to a third embodiment 3 of the live-view optical system of the present invention. A live-view optical system 3 is composed by arranging, in order from the object side, an optical path branching means BS, a cemented positive lens constructed of a first lens G1 having a negative refractive power and a second lens G2 having a positive refractive power, a third lens G3 having a negative refractive power, and a fourth lens G4 having a positive refractive power. A filter FL such as a low-pass filter is inserted between an imaging surface IMG and the fourth lens G4, and an aperture stop ST is arranged between the first lens G1 and the optical path branching means BS. The third lens G3 and the fourth lens G4 are plastic lenses. Further, both surfaces (r7, r8) of the third lens G3 and both surfaces (r9, r10) of the fourth lens G4 are formed of aspherical surfaces.

Table 5 shows lens data of a numerical example 3 in which specific numerical values are applied to the third embodiment 3.

TABLE 5 f = 7.772 FNO. = 2.0

| RADIUS OF CURVATURE | ON-AXIS SURFACE DISTANCE | REFRACTIVE INDEX (Nd) | ABBE NUMBER (νd) |
|---|---|---|---|
| r1 = ∞ | d1 = 7.000 | N1 = 1.51680 | ν1 = 64.20 |
| r2 = ∞ | d2 = 0.100 | | |
| r3 = ∞ | d3 = 0.200 | | |
| r4 = 6313.929 | d4 = 0.755 | N2 = 1.59270 | ν2 = 35.45 |
| r5 = 3.330 | d5 = 2.397 | N3 = 1.88300 | ν3 = 40.80 |
| r6 = −13.998 | d6 = 1.375 | | |
| r7 = −2.497 | d7 = 1.000 | N4 = 1.62017 | ν4 = 24.01 |
| r8 = −10.666 | d8 = 0.300 | | |
| r9 = 34.353 | d9 = 2.193 | N5 = 1.53048 | ν5 = 55.72 |
| r10 = −3.394 | d10 = 3.859 | | |
| r11 = ∞ | d11 = 1.410 | N6 = 1.54426 | ν6 = 69.60 |
| r12 = ∞ | d12 = 0.300 | | |
| r13 = ∞ | d13 = 0.500 | N7 = 1.51680 | ν7 = 64.20 |
| r14 = ∞ | | | |

The 4th-, 6th-, and 8th-order aspherical coefficients A4, A6, and A8 of both surfaces (r7, r8) of the third lens G3 and both surfaces (r9, r10) of the fourth lens G4 in the numerical example 3 are shown in Table 6, along with cone constants ε.

TABLE 6

| SURFACE NUMBER | ε | A4 | A6 | A8 |
|---|---|---|---|---|
| r7 | 0.10000D+01 | 0.82902D−02 | 0.73167D−04 | 0.25606D−03 |
| r8 | 0.10000D+01 | 0.38066D−02 | −0.73147D−03 | 0.79971D−04 |
| r9 | 0.10000D+01 | −0.11632D−02 | −0.53050D−03 | −0.44900D−04 |
| r10 | 0.10000D+01 | 0.35675D−02 | −0.51478D−05 | −0.20278D−04 |

The numerical example 3 satisfies the conditional expression (4).

Figure 10:
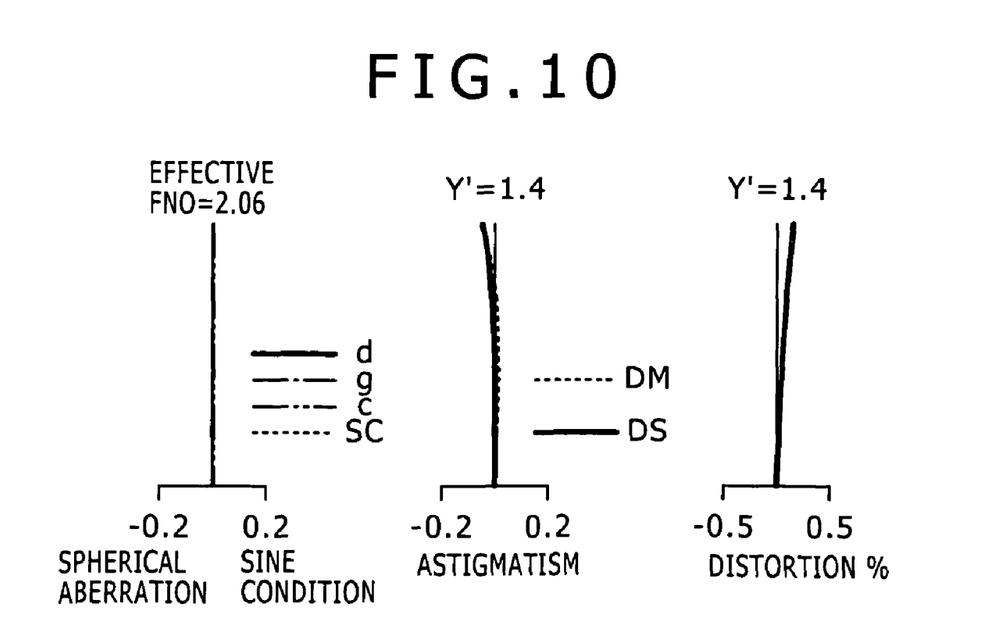
FIG. 10 shows various aberrations, i.e., spherical aberration and a sine condition, astigmatism, and distortion, of a numerical example 3 in which specific numerical values are applied to the third embodiment shown in FIG. 9.

FIG. 10 shows various aberrations, i.e., spherical aberration and a sine condition, astigmatism, and distortion, in the third numerical example 3. It is noted that in a graph showing the spherical aberration and the sine condition, a solid line represents spherical aberration with respect to d-line, an alternate-long-and-short-dashed line represents spherical aberration with respect to g-line, an alternate-long-and-two-short-dashed line represents spherical aberration with respect to C-line, and a dashed line represents the sine condition. Furthermore, in an astigmatism graph, a solid line represents values in a sagittal image surface and a dashed line represents values in a meridional image surface.

Figure 11:
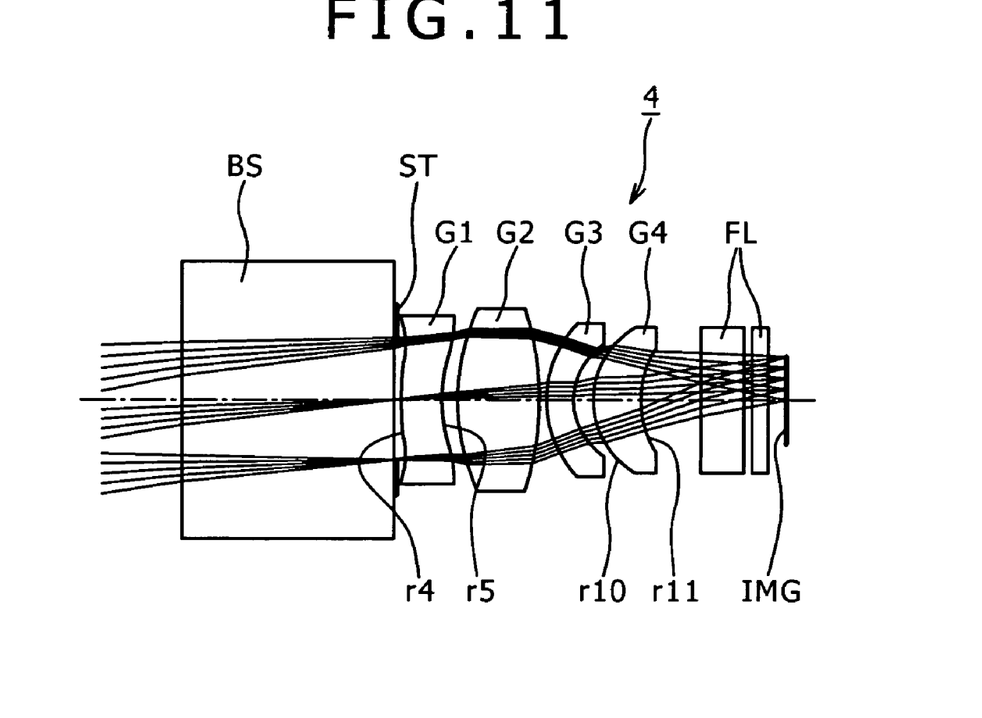
FIG. 11 is a view showing a lens construction according to a fourth embodiment of the live-view optical system.

FIG. 11 is a view showing the lens construction according to a fourth embodiment 4 of the live-view optical system of the present invention. A live-view optical system 4 is composed by arranging, in order from the object side, an optical path branching means BS, a first lens G1 having a negative refractive power, a second lens G2 having a positive refractive power, a third lens G3 having a negative refractive power, and a fourth lens G4 having a positive refractive power. A filter FL such as a low-pass filter is inserted between an imaging surface IMG and the fourth lens G4, and an aperture stop ST is arranged between the first lens G1 and the optical path branching means BS. The first lens G1 and the fourth lens G4 are plastic lenses. Further, both surfaces (r4, r5) of the first lens G1 and both surfaces (r10, r11) of the fourth lens G4 are formed of aspherical surfaces.

Table 7 shows lens data of a numerical example 4 in which specific numerical values are applied to the fourth embodiment 4.

TABLE 7 f = 7.326 FNO. = 2.0

| RADIUS OF CURVATURE | ON-AXIS SURFACE DISTANCE | REFRACTIVE INDEX (Nd) | ABBE NUMBER (νd) |
|---|---|---|---|
| r1 = ∞ | d1 = 7.000 | N1 = 1.51680 | ν1 = 64.20 |
| r2 = ∞ | d2 = 0.100 | | |
| r3 = ∞ | d3 = 0.200 | | |
| r4 = 9.762 | d4 = 1.321 | N2 = 1.62017 | ν2 = 24.01 |
| r5 = 4.878 | d5 = 0.499 | | |
| r6 = 6.745 | d6 = 2.719 | N3 = 1.72916 | ν3 = 54.67 |
| r7 = −8.694 | d7 = 0.200 | | |
| r8 = 3.651 | d8 = 0.897 | N4 = 1.84666 | ν4 = 23.78 |
| r9 = 2.305 | d9 = 0.688 | | |

TABLE 7-continued f = 7.326 FNO. = 2.0

| RADIUS OF CURVATURE | ON-AXIS SURFACE DISTANCE | REFRACTIVE INDEX (Nd) | ABBE NUMBER (νd) |
|---|---|---|---|
| r10 = 2.535 | d10 = 1.593 | N5 = 1.53048 | ν5 = 55.72 |
| r11 = 3.578 | d11 = 1.973 | | |
| r12 = ∞ | d12 = 1.410 | N6 = 1.54426 | ν6 = 69.60 |
| r13 = ∞ | d13 = 0.300 | | |
| r14 = ∞ | d14 = 0.500 | N7 = 1.51680 | ν7 = 64.20 |
| r15 = ∞ | | | |

The 4th-, 6th-, and 8th-order aspherical coefficients A4, A6, and A8 of both surfaces (r4, r5) of the first lens G1 and both surfaces (r10, r11) of the fourth lens G4 in the numerical example 4 are shown in Table 8, along with cone constants ε.

TABLE 8

| SURFACE NUMBER | ε | A4 | A6 | A8 |
|---|---|---|---|---|
| r4 | 0.10000D+01 | −0.88903D−02 | −0.80757D−05 | 0.20329D−04 |
| r5 | 0.10000D+01 | −0.11200D−01 | 0.47498D−03 | 0.13778D−05 |
| r10 | 0.10000D+01 | −0.32195D−02 | −0.39177D−03 | −0.20670D−03 |
| r11 | 0.10000D+01 | 0.16715D−02 | −0.15679D−02 | −0.11572D−03 |

The numerical example 4 satisfies the conditional expression (5).

Figure 12:
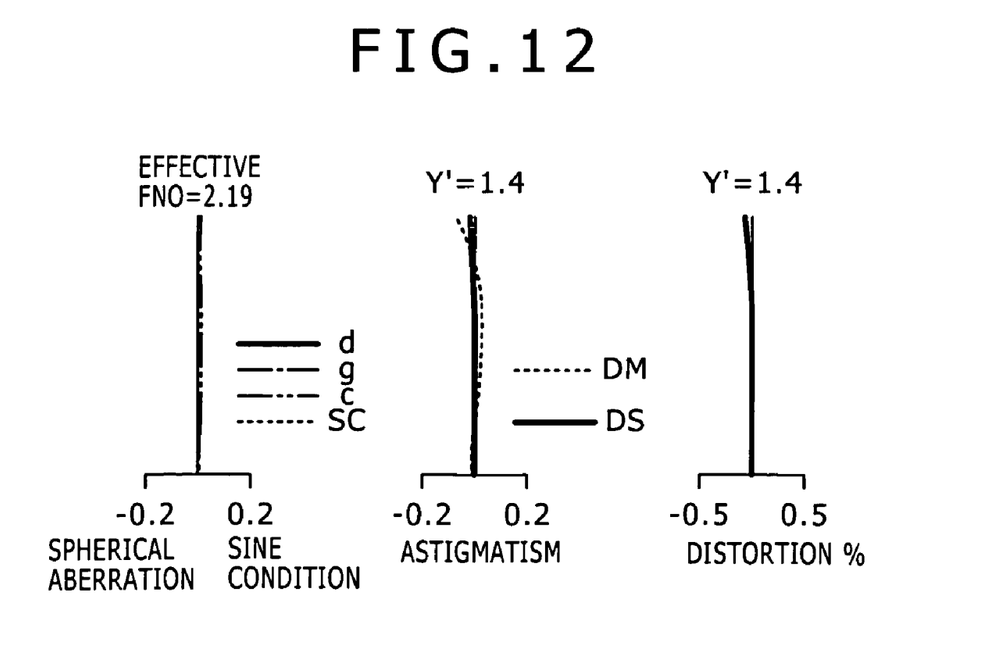
FIG. 12 shows various aberrations, i.e., spherical aberration and a sine condition, astigmatism, and distortion, of a numerical example 4 in which specific numerical values are applied to the fourth embodiment shown in FIG. 11.

FIG. 12 shows various aberrations, i.e., spherical aberration and a sine condition, astigmatism, and distortion, in the fourth numerical example 4. It is noted that in a graph showing the spherical aberration and the sine condition, a solid line represents spherical aberration with respect to d-line, an alternate-long-and-short-dashed line represents spherical aberration with respect to g-line, an alternate-long-and-two-short-dashed line represents spherical aberration with respect to C-line, and a dashed line represents the sine condition. Furthermore, in an astigmatism graph, a solid line represents values in a sagittal image surface and a dashed line represents values in a meridional image surface.

Figure 13:
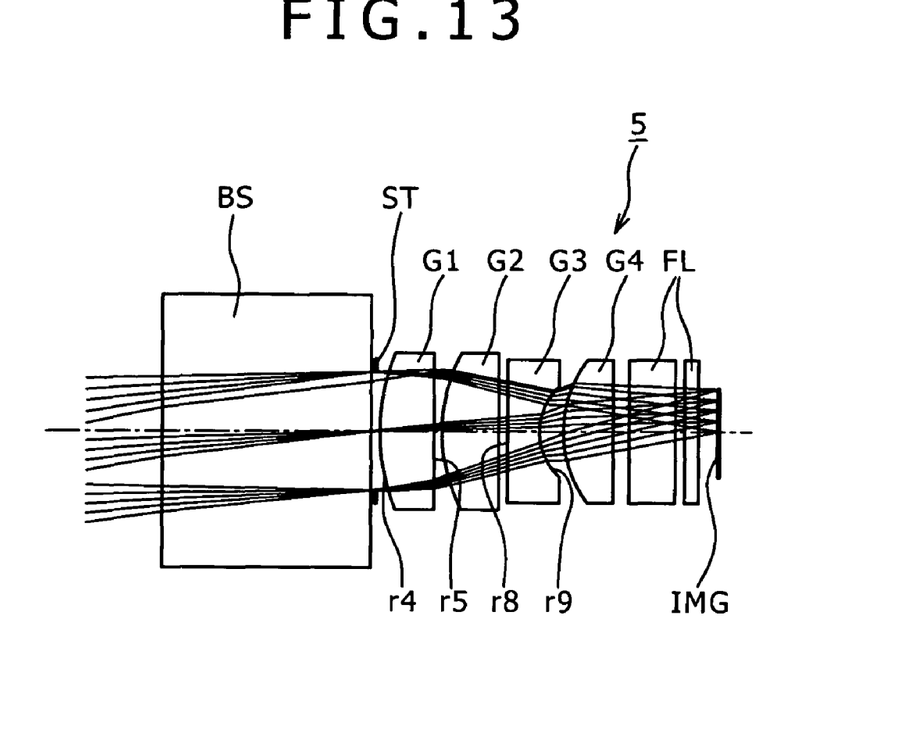
FIG. 13 is a view showing a lens construction according to a fifth embodiment of the live-view optical system.

FIG. 13 is a view showing the lens construction of a fifth embodiment 5 of the live-view optical system of the present invention. A live-view optical system 5 is composed by arranging, in order from the object side, an optical path branching means BS, a first lens G1 having a positive refractive power, a second lens G2 having a positive refractive power, a third lens G3 having a negative refractive power, and a fourth lens G4 having a positive refractive power. A filter FL such as a low-pass filter is inserted between an imaging surface IMG and the fourth lens G4, and an aperture stop ST is arranged between the first lens G1 and the optical path branching means BS. The first lens G1 and the third lens G3 are plastic lenses. Further, both surfaces (r4, r5) of the first lens G1 and both surfaces (r8, r9) of the third lens G3 are formed of aspherical surfaces.

Table 9 shows the lens data of a numerical example 5 in which specific numerical values are applied to the fifth embodiment 5.

TABLE 9

| f = 7.358 FNO. = 2.0 | | | |
|---|---|---|---|
| RADIUS OF CURVATURE | ON-AXIS SURFACE DISTANCE | REFRACTIVE INDEX (Nd) | ABBE NUMBER (νd) |
| r1 = ∞ | d1 = 7.000 | N1 = 1.51680 | ν1 = 64.20 |
| r2 = ∞ | d2 = 0.100 | | |
| r3 = ∞ | d3 = 0.200 | | |
| r4 = 6.411 | d4 = 1.874 | N2 = 1.53048 | ν2 = 55.72 |
| r5 = −55.510 | d5 = 0.200 | | |

TABLE 9-continued

| f = 7.358 FNO. = 2.0 | | | |
|---|---|---|---|
| RADIUS OF CURVATURE | ON-AXIS SURFACE DISTANCE | REFRACTIVE INDEX (Nd) | ABBE NUMBER (νd) |
| r6 = 5.417 | d6 = 1.976 | N3 = 1.72916 | ν3 = 54.67 |
| r7 = 40.825 | d7 = 0.336 | | |
| r8 = 75.928 | d8 = 1.000 | N4 = 1.62017 | ν4 = 24.01 |
| r9 = 1.845 | d9 = 0.872 | | |
| r10 = 4.149 | d10 = 1.730 | N5 = 1.88300 | ν5 = 40.80 |
| r11 = 111.226 | d11 = 0.511 | | |
| r12 = ∞ | d12 = 1.600 | N6 = 1.54426 | ν6 = 69.60 |
| r13 = ∞ | d13 = 0.300 | | |
| r14 = ∞ | d14 = 0.500 | N7 = 1.51680 | ν7 = 64.20 |
| r15 = ∞ | | | |

The 4th-, 6th-, and 8th-order aspherical coefficients A4, A6, and A8 of both surfaces (r4, r5) of the first lens G1 and both surfaces (r8, r9) of the third lens G3 in the numerical example 5 are shown in Table 10, along with cone constants ε.

TABLE 10

| SURFACE NUMBER | ε | A4 | A6 | A8 |
|---|---|---|---|---|
| r4 | 0.10000D+01 | −0.28525D−03 | 0.31956D−04 | −0.18096D−04 |
| r5 | 0.10000D+01 | 0.16938D−02 | −0.20141D−03 | −0.16813D−04 |
| r8 | 0.10000D+01 | 0.22089D−02 | −0.19092D−02 | 0.15271D−03 |
| r9 | 0.10000D+01 | −0.13055D−01 | −0.24713D−02 | −0.17710D−02 |

The numerical example 5 satisfies the conditional expression (6).

Figure 14:
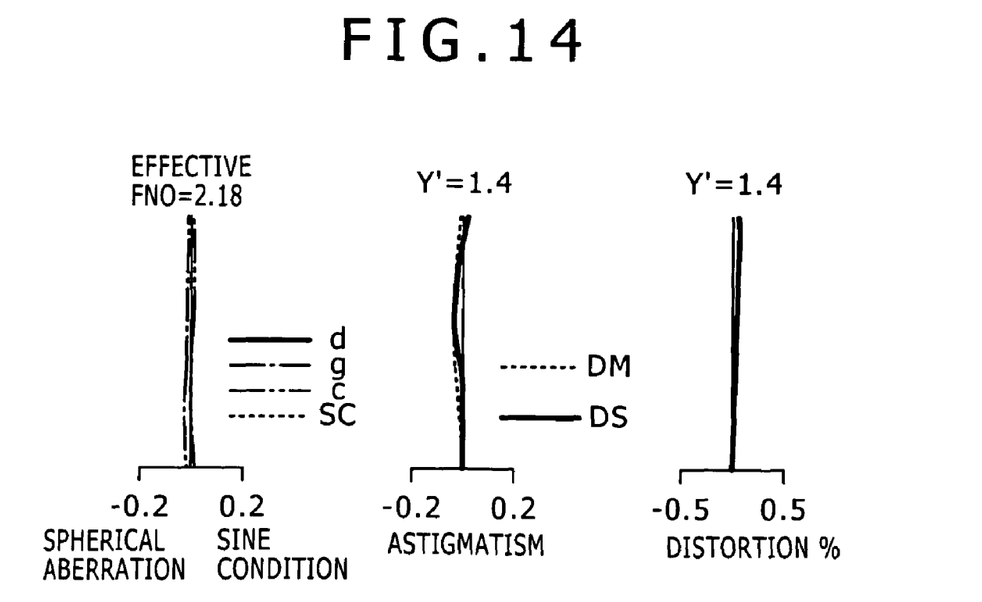
FIG. 14 shows various aberrations, i.e., spherical aberration and a sine condition, astigmatism, and distortion, of a numerical example 5 in which specific numerical values are applied to the fifth embodiment shown in FIG. 13.

FIG. 14 shows various aberrations, i.e., spherical aberration and a sine condition, astigmatism, and distortion, in the fifth numerical example 5. It is noted that in a graph showing the spherical aberration and the sine condition, a solid line represents spherical aberration with respect to d-line, an alternate-long-and-short-dashed line represents spherical aberration with respect to g-line, an alternate-long-and-two-short-dashed line represents spherical aberration with respect to C-line, and a dashed line represents the sine condition. Furthermore, in an astigmatism graph, a solid line represents values in a sagittal image surface and a dashed line represents values in a meridional image surface.

Figure 15:
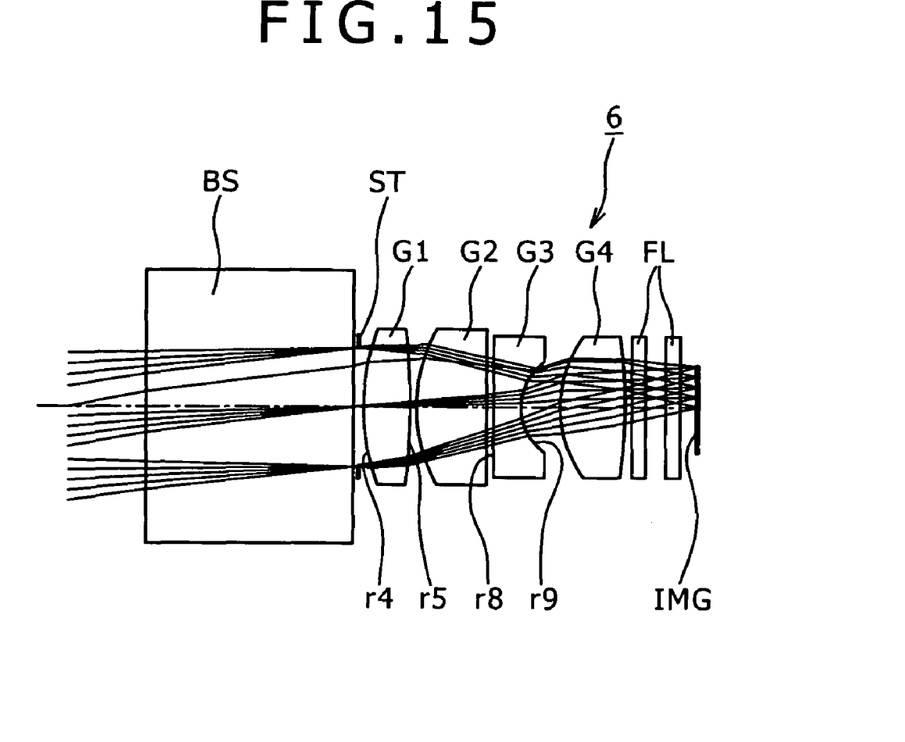
FIG. 15 is a view showing a lens construction according to a sixth embodiment of the live-view optical system.

FIG. 15 is a view showing the lens construction of a sixth embodiment 6 of the live-view optical system of the present invention. A live-view optical system 6 is composed by arranging, in order from the object side, an optical path branching means BS, a first lens G1 having a positive refractive power, a second lens G2 having a positive refractive power, a third lens G3 having a negative refractive power, and a fourth lens G4 having a positive refractive power. A filter FL such as a low-pass filter is inserted between an imaging surface IMG and the fourth lens G4, and an aperture stop ST is arranged between the first lens G1 and the optical path branching means BS. The first lens G1 and the third lens G3 are plastic lenses. Furthermore, both surfaces (r4, r5) of the first lens G1 and both surfaces (r8, r9) of the third lens G3 are formed of aspherical surfaces.

Table 11 shows the lens data of a numerical example 6 in which specific numerical values are applied to the sixth embodiment 6.

TABLE 11 f = 7.473 FNO. = 2.0

| RADIUS OF CURVATURE | ON-AXIS SURFACE DISTANCE | REFRACTIVE INDEX (Nd) | ABBE NUMBER (vd) |
|---|---|---|---|
| r1 = ∞ | d1 = 7.000 | N1 = 1.51680 | v1 = 64.20 |
| r2 = ∞ | d2 = 0.200 | | |
| r3 = ∞ | d3 = 0.200 | | |
| r4 = 7.713 | d4 = 1.570 | N2 = 1.53048 | v2 = 55.72 |
| r5 = −17.201 | d5 = 0.200 | | |
| r6 = 5.000 | d6 = 2.350 | N3 = 1.61800 | v3 = 63.39 |
| r7 = ∞ | d7 = 0.210 | | |
| r8 = −79.765 | d8 = 1.000 | N4 = 1.60700 | v4 = 27.00 |
| r9 = 1.788 | d9 = 1.340 | | |
| r10 = 4.000 | d10 = 2.160 | N5 = 1.81600 | v5 = 46.57 |
| r11 = −56.700 | d11 = 0.310 | | |
| r12 = ∞ | d12 = 0.450 | N6 = 1.51680 | v6 = 64.20 |
| r13 = ∞ | d13 = 0.700 | | |
| r14 = ∞ | d14 = 0.500 | N7 = 1.51680 | v7 = 64.20 |
| r15 = ∞ | | | |

The 4th-, 6th-, 8th-, and 10th-order aspherical coefficients A4, A6, A8, and A10 of both surfaces (r4, r5) of the first lens G1 and both surfaces (r8, r9) of the third lens G4 in the numerical example 6 are shown in Table 12, along with cone constants $\epsilon$.

TABLE 12

| SURFACE NUMBER | $\epsilon$ | A4 | A6 | A8 | A10 |
|---|---|---|---|---|---|
| r4 | 0.10000D+01 | −0.54999D−03 | 0.10552D−04 | −0.76368D−06 | −0.49559D−07 |
| r5 | 0.10000D+01 | 0.12552D−02 | −0.26686D−03 | 0.81818D−04 | −0.94388D−05 |
| r8 | 0.10000D+01 | 0.30411D−02 | −0.79920D−03 | 0.17868D−04 | 0.0 |
| r9 | 0.10000D+01 | −0.12069D−01 | −0.29258D−02 | −0.10126D−02 | −0.34860D−03 |

The numerical example 6 satisfies the conditional expression (6).

Figure 16:
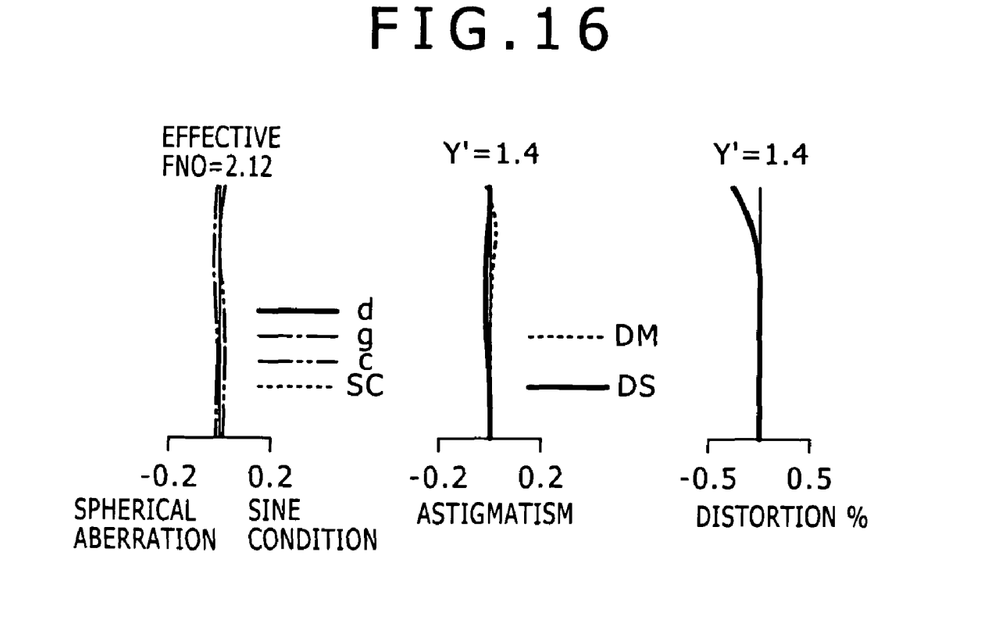
FIG. 16 shows various aberrations, i.e., spherical aberration and a sine condition, astigmatism, and distortion, of a numerical example 6 in which specific numerical values are applied to the sixth embodiment shown in FIG. 15.

FIG. 16 shows various aberrations, i.e., spherical aberration and a sine condition, astigmatism, and distortion, in the sixth numerical example 6. It is noted that in a graph showing the spherical aberration and the sine condition, a solid line represents spherical aberration with respect to d-line, an alternate-long-and-short-dashed line represents spherical aberration with respect to g-line, an alternate-long-and-two-short-dashed line represents spherical aberration with respect to C-line, and a dashed line represents the sine condition. Furthermore, in the astigmatism graph, a solid line represents values in a sagittal image surface and a dashed line represents values in a meridional image surface.

Table 13 shows values corresponding to the conditional expressions (1) to (6) of the numerical examples 1 to 6.

TABLE 13

| | Example 1 | Example 2 | Example 3 | Example 4 | Example 5 | Example 6 |
|---|---|---|---|---|---|---|
| Dp | 3.93 | 4.01 | 4.01 | 4.01 | 4.01 | 3.97 |
| Zp | 77.32 | 78.86 | 78.86 | 78.86 | 78.86 | 78.86 |
| Y | 14.2 | 14.2 | 14.2 | 14.2 | 14.2 | 14.2 |
| Za | 67.49 | 69.50 | 69.50 | 69.50 | 69.50 | 69.50 |
| Ra | 5.20 | 5.30 | 5.30 | 5.30 | 5.30 | 5.30 |

TABLE 13-continued

| | Example 1 | Example 2 | Example 3 | Example 4 | Example 5 | Example 6 |
|---|---|---|---|---|---|---|
| Conditional expression (1) | 1.01 | 1.03 | 1.03 | 1.03 | 1.03 | 1.03 |
| φp | 0.209 | 0.245 | 0.168 | 0.093 | 0.091 | 0.097 |
| φm | −0.392 | −0.319 | −0.181 | −0.057 | −0.326 | −0.349 |
| φp/φm | −0.53 | −0.77 | −0.93 | −1.64 | −0.28 | −0.28 |

Then, the image capture apparatus of the present invention will be described.

The image capture apparatus of the present invention is an image capture apparatus capable of obtaining an image of an object in a motion picture form by reflecting an optical image formed on a focusing plate by a part of a reflective surface of a penta-dach mirror and by re-forming the optical image on a live-view imaging device. The position of an entrance pupil of a live-view optical system, which is positioned between an opening of the penta-dach mirror and the live-view imaging device and which re-forms light reflected by the part of the reflective surface on the live-view imaging device, satisfies the following conditional expression (1):

$$0.75 < ((Dp/2-Y) \cdot Za)/((Ra\sqrt{2}-Y) \cdot Zp) \quad (1)$$

where

Dp is a diameter of an entrance pupil of the live-view optical system,

Zp is a distance from the focusing plate to the entrance pupil of the live-view optical system, Y is a maximum image height on the focusing plate, Za is a distance from the focusing plate to the opening of the penta-dach mirror, and Ra is a distance from an optical axis of the live-view optical system to a dach ridgeline.

According to the image capture apparatus of the present invention, the vignetting at the opening of the penta-dach mirror of the light reflected by the part of the reflective surface of the penta-dach mirror and heading toward the live-view imaging device is decreased, so that it becomes possible to obtain a live-view image exhibiting a less reduction in marginal illumination.

Figure 17:
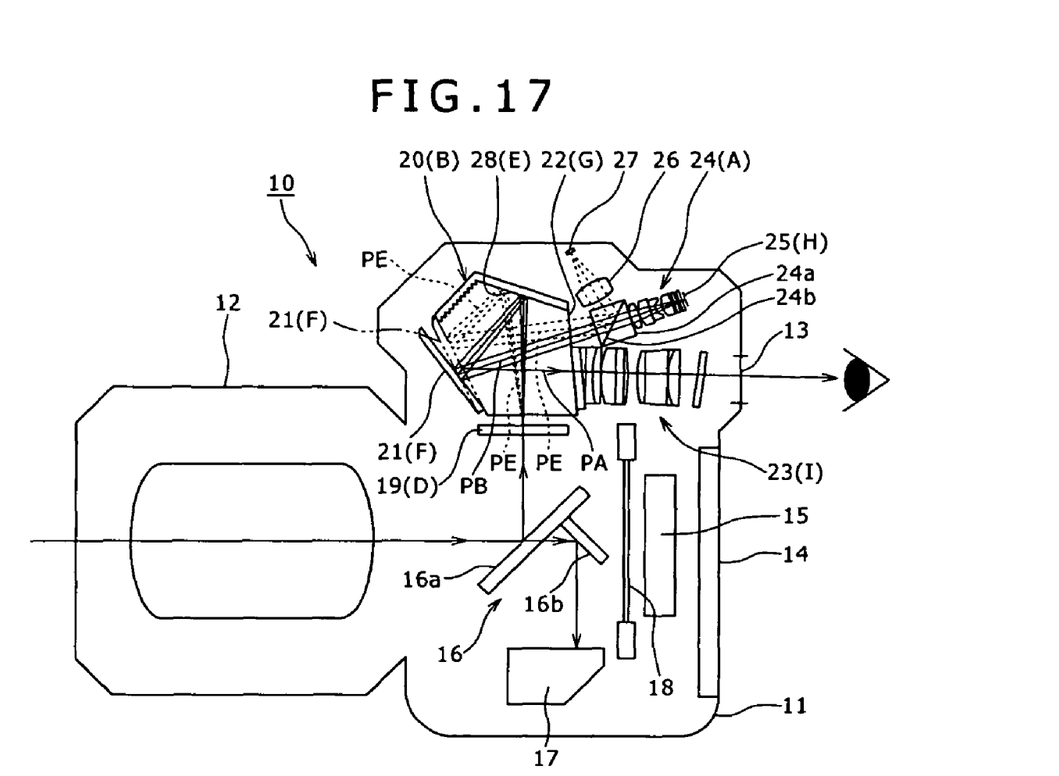
FIG. 17 is a schematic explanatory view showing an embodiment of an image capture apparatus according to the present invention.

FIG. 17 shows an example 10 of an embodiment into which the image capture apparatus of the present invention is embodied.

An image capture apparatus 10 shown in FIG. 17 is configured as a lens-interchangeable single-lens reflex type digital camera.

The image capture apparatus 10 includes a camera body 11, and it is configured such that an interchangeable phototaking lens unit (interchangeable lens) 12 can be releasably attached to the camera body 11.

A finder window 13 is provided at an upper, approximately middle part of the back of the camera body 11. A photographer makes a visual identification of a light image of an object guided from the photo-taking lens unit 12 by looking through the finder window, and thus can decide on a picture composition and the like.

A back monitor 14 is arranged so as to occupy a large part of the back of the camera body 11. The back monitor 14 is configured as, for example, a color liquid crystal display (LCD). The back monitor 14 can display a menu screen for setting imaging conditions and the like, and, in an image playback mode, can reproduce and display a taken image recorded on an incorporated memory or removable memory which is not shown. In addition, in this image capture apparatus 10, a plurality of time-sequential images (i.e., a moving picture) captured by utilizing the light image of the object guided from the photo-taking lens unit 12 can be displayed as a live-view image on the back monitor 14.

The camera body 11 incorporates a main imaging device 15 therein. A solid-state imaging device such as a charge-coupled device (CCD) or a complementary metal-oxide semiconductor (CMOS) is applied to the main imaging device 15.

The light image of the object guided into the photo-taking lens unit 12 is received by the main imaging device 15 to capture an image signal therefrom.

A mirror mechanism 16 is provided on an optical path (image-taking optical path) which goes from the photo-taking lens unit 12 to the main imaging device 15. The mirror mechanism 16 includes a main mirror 16a which reflects light from the photo-taking lens unit 12, upward. This main mirror 16a is configured, in part or in all, as a half mirror, transmitting a part of the light from the photo-taking lens unit 12 therethrough. The mirror mechanism 16 includes a sub-mirror 16b which reflects the light transmitted through the main mirror 16a, downward. The light reflected downward by the sub-mirror 16b is received by an AF module 17, and utilized for AF (Auto Focus) operation based on, for example, a phase left scheme, by this AF module 17. It is noted that the mirror mechanism 16 is driven between a mirror-down state in which the mirror mechanisms 16 is positioned within the image-taking optical path and a mirror-up state in which the mirror mechanism 16 gets out of the image-taking optical path.

Further, a shutter membrane 18 which can be opened and closed is provided between the mirror mechanism 16 and the main imaging device 15.

A focusing plate 19 (D: which corresponds to the same part of FIG. 1. The same applies to the following capital letters in parentheses) is arranged above the mirror mechanism 16, and an object image reflected upward by the main mirror 16a is once formed on this focusing plate 19.

A penta-dach mirror 20 (B) is arranged above the focusing plate 19. A part of a reflective surface 21 (F) of the penta-dach mirror 20 is formed as an angle-variable reflective surface in which angles thereof are variable. An object side of a finder optical system 23 (I) faces the most part of an opening 22 (G) of the penta-dach mirror 20 excluding an upper portion of the opening. In the upper portion of the opening 22 of the penta-dach mirror 20, a live-view optical system 24 (A) is arranged to face the opening 22. A live-view imaging device 25 (H) is arranged at a re-image-formation position of the live-view optical system 24. Further, an optical system 26 for photometric measurement and a photometric measurement module 27 are arranged on a split optical path side of a light path splitting means 24a composed of, for example, a beam splitter and the like, of the live-view optical system 24.

In the image capture apparatus 10, the photographer can decide on a picture composition on the basis of a light image of an object visually identified through the finder window 13 via the finder optical system 23, and can alternatively decide on a picture composition on the basis of a live-view image captured by the live-view imaging device 25 through the live-view optical system 24 and displayed on the back monitor 14.

When the angle of the angle-variable reflective surface 21 being varied by operating switching means which is provided on the camera body 11 and which is not shown, is in a state indicated by an alternate-long-and-two-short-dashed line in FIG. 17, light which has been reflected by the main mirror 16a and has transmitted through the focusing plate 19 is reflected by a dach section 28 (E) of the penta-dach mirror 20, and thereafter reflected in a direction indicated by a solid line PA by the angle-variable reflective surface 21 to enter the finder optical system 23, so that the entered light can be visually identified by being viewed through the finder window 13.

It is noted that a part PE of light having entered the penta-dach mirror 20 at an angle different from that of a light beam indicated by a solid line in FIG. 17 is reflected by the dach section 28, thereafter reflected by the angle-variable reflective surface 21, reflected by an optical path splitting surface 24b of the optical path splitting means 24a in the live-view optical system 24, then received by the photometric measurement module 27 via the photometric measurement optical system 26, to be utilized for photometric measurement. For example, on the basis of the photometric measurement result, processing of setting photo-taking parameters (F-number, shutter speed, and the like) for providing a suitable brightness of a photo to be taken is performed.

When the angle of the angle-variable reflective surface 21 is brought to a state indicated by the solid line in FIG. 17 by an operation of the switching means which is not shown, light which has been reflected by the main mirror 16a and then has transmitted through the focusing plate 19 is reflected by the dach section 28(E) of the penta-dach mirror 20, and thereafter reflected in a direction indicated by a solid line PB by the angle-variable reflective surface 21 to enter the live-view optical system 24, and this light is received by the live-view imaging device 25. Then, a live-view image (moving picture) which is obtained through a light reception by the live-view imaging device 25, is displayed on the back monitor 14.

As described above, in the image capture apparatus 10, the photographer can suitably select from ways of deciding on a picture composition on the basis of an optical image viewed through the finder window 13, and deciding on a picture composition by viewing a live-view image displayed on the back monitor 14.

When a picture composition is decided and a shutter release button which is not shown, is depressed approximately halfway along a depressing stroke (in a so-called half-pushed state), decisions about f-stop number, shutter speed, and the like are performed in the case of AF operation and AE (Automatic Exposure) mode. Then, when the shutter release button is depressed to the lower end of the depressing stroke (in a so-called fully-pushed state), the mirror mechanism 16 is brought to the mirror-up state in which the mirror mechanism 16 gets out of the image-taking optical path, and also the shutter membrane 18 is kept open for a predetermined time determined by the shutter speed, so that the main imaging device 15 is exposed, and thus a still image is captured.

It is noted that the shape and the numerical value of each part which have been referred to in the above description of the embodiments are provided merely as one example of various embodiments for carrying out the present invention, and the technical scope of the invention should not be interpreted restrictively by them.

The invention claimed is:

1. In an image capture apparatus capable of obtaining an image of an object in a moving picture mode by reflecting an optical image formed on a focusing plate from a part of a reflective surface of a penta-dach mirror and by re-forming the optical image on a live-view imaging device, a live-view optical system positioned between an opening of the penta-dach mirror and the live-view imaging device, and which re-forms light reflected from the part of the reflective surface on the live-view imaging device, and characterized in that
a position of an entrance pupil satisfies the following conditional expression (1):

$$0.75 < ((Dp/2-Y)\cdot Za)/((Ra\sqrt{2}-Y)\cdot Zp) \quad (1)$$

where

Dp is a diameter of the entrance pupil of the live-view optical system,
Zp is a distance from the focusing plate to the entrance pupil of the live-view optical system,
Y is a maximum image height on the focusing plate,
Za is a distance from the focusing plate to the opening of the penta-dach mirror, and
Ra is a distance from an optical axis of the live-view optical system to a dach ridgeline.

2. The live-view optical system according to claim 1, characterized by including, in order from an object side,
a first lens having a positive refractive power, a second lens having a negative refractive power, and a third lens having a positive refractive power, and characterized in that
the first lens and the second lens are plastic lenses, and
the following conditional expression (2) is satisfied:

$$-0.65 < \phi p1/\phi m1 < -0.45 \quad (2)$$

where $\phi p1$ is a refractive power of the positive plastic lens (the first lens), and
$\phi m1$ is a refractive power of the negative plastic lens (the second lens).

3. The live-view optical system according to claim 1, characterized by including, in order from an object side,
a first lens having a positive refractive power, a second lens having a negative refractive power, and a third lens having a positive refractive power, and characterized in that
the second lens and the third lens are plastic lenses, and
the following conditional expression (3) is satisfied:

$$-0.85 < \phi p2/\phi m2 < -0.65 \quad (3)$$

where $\phi p2$ is a refractive power of the positive plastic lens (the third lens), and
$\phi m2$ is a refractive power of the negative plastic lens (the second lens).

4. The live-view optical system according to claim 1, characterized by including, in order from an object side,
a cemented positive lens including a first lens and a second lens, a third lens having a negative refractive power, and a fourth lens having a positive refractive power, and characterized in that
the third lens and the fourth lens are plastic lenses, and
the following conditional expression (4) is satisfied:

$$-1.05 < \phi p3/\phi m3 < -0.85 \quad (4)$$

where $\phi p3$ is a refractive power of the positive plastic lens (the fourth lens), and
$\phi m3$ is a refractive power of the negative plastic lens (the third lens).

5. The live-view optical system according to claim 1, characterized by including, in order from an object side,
a first lens having a negative refractive power, a second lens having a positive refractive power, a third lens having a negative refractive power, and a fourth lens having a positive refractive power, and characterized in that
the first lens and the fourth lens are plastic lenses, and
the following conditional expression (5) is satisfied:

$$-1.80 < \phi p4/\phi m4 < -1.40 \quad (5)$$

where $\phi p4$ is a refractive power of the positive plastic lens (the fourth lens), and
$\phi m4$ is a refractive power of the negative plastic lens (the first lens).

6. The live-view optical system according to claim 1, characterized by including, in order from an object side,
a first lens having a positive refractive power, a second lens having a positive refractive power, a third lens having a negative refractive power, and a fourth lens having a positive refractive power, and characterized in that
the first lens and the third lens are plastic lenses, and
the following conditional expression (6) is satisfied:

$$-0.40 < \phi p5/\phi m5 < -0.20 \quad (6)$$

where $\phi p5$ is a refractive power of the positive plastic lens (the first lens), and
$\phi m5$ is a refractive power of the negative plastic lens (the third lens).

7. The live-view optical system according to claim 2, characterized by including an aperture stop on the object side of the first lens.

8. The live-view optical system according to claim 2, characterized by including an optical path branching means on the object side of the first lens.

9. The live-view optical system according to claim 7, characterized by including an optical path branching means on the object side of the aperture stop.

10. An image capture apparatus capable of obtaining an image of an object in a moving picture mode by reflecting an optical image formed on a focusing plate from a part of a reflective surface of a penta-dach mirror and by re-forming the optical image on a live-view imaging device, the image capture apparatus characterized in that:
a position of an entrance pupil of a live-view optical system, which is positioned between an opening of the penta-dach mirror and the live-view imaging device, and which re-forms light reflected by the part of the reflective surface on the live-view imaging device, satisfies the following conditional expression (1):

$$0.75 < ((Dp/2-Y)\cdot Za)/((Ra\sqrt{2}-Y)\cdot Zp) \quad (1)$$

where

Dp is a diameter of the entrance pupil of the live-view optical system,
Zp is a distance from the focusing plate to the entrance pupil of the live-view optical system,
Y is a maximum image height on the focusing plate,
Za is a distance from the focusing plate to the opening of the penta-dach mirror, and
Ra is a distance from an optical axis of the live-view optical system to a dach ridgeline.

* * * * *